United States Patent Office 3,563,990
Patented Feb. 16, 1971

---

3,563,990
1-SUBSTITUTED-4-ARYL-2(1H)-QUINAZOLINONES
Goetz E. Hardtmann, Florham Park, N.J., assignor to Sandoz-Wander, Inc., a corporation of Delaware
No Drawing. Filed Mar. 18, 1969, Ser. No. 808,338
Int. Cl. C07d 51/48
U.S. Cl. 260—251             7 Claims

ABSTRACT OF THE DISCLOSURE

The invention discloses preparation of 1-substituted-4-aryl-2(1H)-quinazolinones from their corresponding 1-substituted-4-aryl - 5,6,7,8 - tetrahydro-2(1H)-quinazolinones.

---

The present invention relates to preparation of bicyclic compounds, and more particularly to the preparation of 1-substituted - 4 - aryl-2(1H)-quinazolinones of the Formula I:

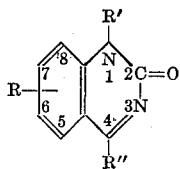

wherein

R' is lower alkyl, preferably 1 to 4 carbon atoms, e.g. methyl, isopropyl, etc.;
R is hydrogen or lower alkyl, preferably of from 1 to 3 carbon atoms;
R" is phenyl or substituted phenyl of the formula:

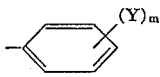

Y is halo of atomic weight of from 19 to 80, lower alkyl, preferably of from 1 to 3 carbon atoms, or lower alkoxy, preferably of from 1 to 2 carbon atoms; and
m is 0 to 2, and when 2 then Y is the same or different.

In accordance with the present invention the compounds of Formula I are prepared by subjecting a 5,6,7,8-tetrahydro-2(1H)-quinazolinone by subjecting the latter to the action of a 2,3-dichloro-1,4-benzoquinone from the group of 2,3,5,6-tetrachloro-1,4-benzoquinone and 2,3-dichloro-5,6-dicyano-1,4-benzoquinone at elevated temperatures in the range of from 60° C. to 140° C. of Formula II:

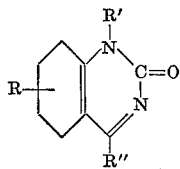

wherein R, R' and R" are as defined, to the action of a 2,3-dichloro-1,4-benzoquinone at elevated temperatures in an inert solvent medium.

The preparation of compounds I involves subjecting a corresponding compound II to the action of a 2,3-dichloro-1,4-benzoquinone from the group of 2,3,5,6-tetrachloro-1,4-benzoquinone and 2,3-dichloro-5,6-dicyano-1,4-benzoquinone. Such dehydrogenation reaction is carried out in an inert organic solvent at elevated temperatures conveniently in the range of 60° C. to 140° C., preferably 75° C. to 120° C. The organic solvent employed may be any several of the conventional organic solvents which provide an inert reaction medium. The preferred organic solvents are the aromatic solvents including by way of example benzene and toluene, preferably benzene. The preparation of compounds I in accordance with the invention requires two moles of the 2,3-dichloro-1,4-benzoquinone per mole of compound II in order to complete the reaction. The benzoquinone may be employed in substantial excess but provides no substantial added advantage and, in general, it is desirable to conduct the reaction with the mole ratio of the benzoquinone to compound II being in the range of at least about 2:1 to about 3:1. The product compound of Formula I may be isolated from the reaction mixture by working up by established procedures.

The compounds of Formula II of the invention are preferably prepared by reaction of a 2-benzoyl-cyclohexanone of Formula III:

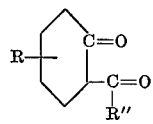

wherein R and R" are as above-defined, with a lower alkylurea of Formula IV:

wherein R' is as above-defined, at elevated temperatures in the presence of an acid and in an organic solvent medium.

The preparation of compounds II by reaction of compounds III and IV is carried out in the presence of an acid and in an organic solvent at elevated temperatures in the range of 40° C. to 200° C., preferably 100° C. to 160° C. The reaction is most suitably carried out in the presence of an acid catalyst and employing an organic acid as the organic solvent medium. The organic solvent is thus most conveniently provided by using an aliphatic carboxylic acid of 2 to 4 carbon atoms, e.g., acetic or propionic acid, preferably acetic acid. As the acid catalyst it is generally desirable to employ a strong acid such as a mineral acid, most suitably a hydrogen halide such as hydrogen chloride or hydrogen bromide, preferably hydrogen chloride.

The compounds III and IV employed as starting materials in the above-described reaction are either known or can be prepared from known material by established procedures.

The compounds of structural Formula I are useful because they possess pharmacological activity in animals. In particular, the compounds are useful as anti-inflammatory agents as indicated by the carregeenin-induced edema test on rats (oral administration). For such use, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. The dosage administered will, of course, vary depending upon the compounds used and the mode of administration. However, in general, satisfactory results are obtained when administered at a daily dosage of from about .15 milligram to about 100 milligrams per kilogram of body weight, preferably given in divided doses 2 to 4 times a day, or in sustained release form. For most mammals the administration of from about 10 milligrams to about 1000 milligrams of the compound per day provides satisfactory results and dosage forms suitable for internal administration comprise from about 3 milligrams to about 500 milligrams of the compound in admixture with a solid or liquid pharmaceutical carrier or diluent.

The compounds of Formula II are also useful as anti-inflammatory as indicated by the edema test on rats and may be administered in modes and forms similar to those of compounds I. For such use the compounds II may be administered to obtain satisfactory results at a daily dosage of from about 5 milligrams to about 200 milligrams per kilogram of animal body weight with the daily dosage for most mammals being in the range of 300 milligrams to 2000 milligrams per day and dosage forms for internal administration comprising 75 milligrams to 1000 milligrams of the compound in admixture with a solid or liquid pharmaceutical carrier or diluent.

The following examples show representative compounds encompassed within the scope of this invention and the manner in which such compounds are prepared. However, it is to be understood that the examples are for purposes of illustration only and are not intended as in any way limiting the scope of the invention.

EXAMPLE 1

1-isopropyl-4-phenyl-2(1H)-quinazolinone

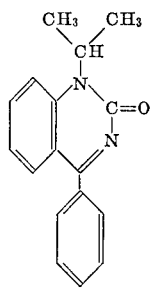

Step A.—Preparation of 1-isopropyl-4-phenyl-5,6,7,8-tetrahydro-2(1H)-quinazolinone A mixture of 12 g. of 2-benzoylcyclohexanone and 6 g. of isopropylurea in 300 ml. glacial acetic acid is refluxed for 100 hours while anhydrous hydrogen chloride is introduced into the mixture. After cooling the resulting mixture is poured on ice-water (1 kg.), made basic with 50% sodium hydroxide, and extracted 4 times each with 200 ml. of methylene chloride. The organic phases are combined and washed first with water and then with saturated sodium chloride solution. After drying the organic liquid is evaporated in vacuo to obtain an oil which is treated by addition of diethyl ether to a crystalline material which is dissolved in methylene chloride. The resulting solution is filtered first through carbon and then thru aluminum oxide and the methylene chloride replaced by ethyl acetate from which is crystallized 1-isopropyl-4-phenyl-5,6,7,8-tetrahydro-2(1H)-quinazolinone, M.P. 185–187° C.

Step B.—Preparation of 1-isopropyl-4-phenyl-2(1H)-quinazolinone

A mixture of 1.6 g. of 1-isopropyl-4-phenyl-5,6,7,8-tetrahydro-2(1H)-quinazolinone, 50 ml. of benzene and 3.1 g. of 2,3-dichloro-5,6-dicyano-1,4-benzoquinone is refluxed for 3 hours, and the mixture then cooled and treated by addition of 100 ml. of petroleum ether. The resulting mixture is filtered, the filtrate evaporated to dryness and the residue crystallized from ethyl acetate to obtain 1-isopropyl - 4 - phenyl-2(1H)-quinazolinone, M.P. 171–172° C.

What is claimed is:
1. The process for preparation of a compound of the formula:

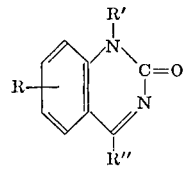

wherein

R' is lower alkyl;
R is hydrogen or lower alkyl;
R" is phenyl or substituted phenyl of the formula:

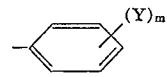

Y is halo of atomic weight of from 19 to 80, lower alkyl, or lower alkoxy; and
m is 0 to 2, and when 2 then Y is the same or different;

said process comprising subjecting a quinazolinone of the formula:

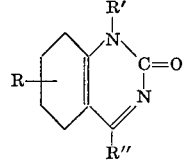

wherein R, R' and R" are as defined, to the action of 2,3-dichloro-5,6-dicyano-1,4-benzoquinone or 2,3,5,6-tetrachloro-1,4-benzoquinone in a mole ratio of at least about 2 moles of benzoquinone per mole of quinazolinone at a temperature in the range of 60° C. to 140° C. and in an inert organic solvent.

2. The process of claim 1 in which the dehydrogenation reagent is 2,3-dichloro-5,6-dicyano-1,4-benzoquinone.

3. The process of claim 1 in which the temperature is in the range of 75° C. to 120° C.

4. The process of claim 3 in which the ratio of the benzoquinone to quinazolinone is in the range of 2:1 to 3:1.

5. The process of claim 1 in which the dehydrogenation reagent is 2,3,5,6-tetrachloro-1,4-benzoquinone.

6. The process of claim 5 in which the temperature is in the range of 75° C. to 120° C.

7. The process of claim 6 in which the ratio of the benzoquinone to quinazolinone is in the range of 2:1 to 3:1.

References Cited

UNITED STATES PATENTS 3,305,553    2/1967    Hoefle et al. _____ 260—256.4

ALEX MAZEL, Primary Examiner
R. V. RUSH, Assistant Examiner

U.S. Cl. X.R.
424—251

UNITED STATES PATENT OFFICE
CERTIFICATE OF CORRECTION

Patent No. 3,563,990      Dated February 16, 1971

Inventor(s) Goetz E. Hardtmann

It is certified that error appears in the above-identified patent and that said Letters Patent are hereby corrected as shown below:

Column 1,

Line 14, immediately following "linones" insert: --by subjecting the latter to the action of a 2,3-dichloro-1,4-benzoquinone from the group of 2,3,5,6-tetrachloro-1,4-benzoquinone and 2,3-dichloro-5,6-dicyano-1,4-benzoquinone at elevated temperatures in the range of from 60° C. to 140° C.--

Column 1,

Line 44, thru line 49, immediately following "quinazolinone" delete: by ----- ----- ----- ----- ----- to 140°C.

Signed and sealed this 12th day of December 1972.

(SEAL)
Attest:

EDWARD M. FLETCHER, JR.            ROBERT GOTTSCHALK
Attesting Officer                    Commissioner of Pate

Disclaimer 3,563,990.—*Goetz E. Hardtmann*. Florham Park, N.J. 1-SUBSTITUTED-4-ARYL-2(1H)-QUINAZOLINONES. Patent dated Feb. 16, 1971. Disclaimer filed Sept. 21, 1973, by the assignee, *Sandoz-Wander, Inc.*
Hereby enters this disclaimer to all claims of said patent.
   [*Official Gazette February 5, 1974*]